United States Patent
Sarangapani et al.

(10) Patent No.: US 10,073,768 B1
(45) Date of Patent: Sep. 11, 2018

(54) SMART MIGRATION/REMEDIATION ENGINE

(71) Applicant: M/S. Cigniti Technologies Limited, Hyderabad (IN)

(72) Inventors: Rajesh Sarangapani, Hyderabad (IN); Sireesha Simakurthy, Secunderabad (IN); Moshe Dayan, Hyderabad (IN); Kasi Viswanath Kurva, Gadwal (IN); Suneel Kumar Rallapalli, Chittoor (IN)

(73) Assignee: M/S. Cigniti Technologies Limited, Hyderabad (IN)

( * ) Notice: Subject to any disclaimer, the term of this patent is extended or adjusted under 35 U.S.C. 154(b) by 0 days.

(21) Appl. No.: 15/619,624

(22) Filed: Jun. 12, 2017

(30) Foreign Application Priority Data

Jun. 7, 2017 (IN) .............................. 201741020045

(51) Int. Cl.
| | |
|---|---|
| *G06F 11/36* | (2006.01) |
| *G06F 8/33* | (2018.01) |
| *G06F 8/41* | (2018.01) |
| *G06F 8/76* | (2018.01) |

(52) U.S. Cl.
CPC ............ *G06F 11/3696* (2013.01); *G06F 8/33* (2013.01); *G06F 8/42* (2013.01); *G06F 11/368* (2013.01); *G06F 11/3684* (2013.01); *G06F 8/76* (2013.01)

(58) Field of Classification Search
CPC ................................................ G06F 11/3684
USPC ....................................................... 717/125
See application file for complete search history.

(56) References Cited

U.S. PATENT DOCUMENTS

| | | | |
|---|---|---|---|
| 6,502,102 B1 | 12/2002 | Haswell | |
| 6,536,037 B1 * | 3/2003 | Guheen | ..................... G06F 8/71 703/2 |
| 8,051,410 B2 * | 11/2011 | Marfatia | ................... G06F 8/76 717/124 |
| 9,053,238 B2 * | 6/2015 | Krishnan | ............ G06F 11/3664 |
| 2003/0046029 A1 | 3/2003 | Wiener | |
| 2006/0156287 A1 * | 7/2006 | Vikram | ............... G06F 11/3684 717/124 |
| 2006/0230319 A1 * | 10/2006 | Ryali | .................. G06F 11/3684 714/38.14 |
| 2007/0266165 A1 * | 11/2007 | Li | ............................. G06F 8/71 709/230 |
| 2009/0217302 A1 * | 8/2009 | Grechanik | ................ G06F 8/70 719/320 |

(Continued)

*Primary Examiner* — Qing Chen
*Assistant Examiner* — Clint Thatcher
(74) *Attorney, Agent, or Firm* — Laurence P. Colton; Smith Tempel Blaha LLC

(57) ABSTRACT

A Post Migration platform that has a Remediation Engine that checks for errors and warnings in the generated code from the source code, both in a different language. The system provides the options to the user for resolving the ambiguity, issues, and warnings with best practice suggestions. The engine consists of Smart (migration) Remedy Engine 4, a Report Engine 17 and a Log Engine 18. The tool generated files 1 are passed into the Smart (migration) Remedy Engine 4 that checks for syntactic and semantic errors, warnings, uncertainties, and ambiguities in the code, and also analyzes the code for the best practices. The Technical Logs are generated by the Log Engine 16. A report is generated which contains a list of technical errors, warnings and stack traces along with the TODO list.

7 Claims, 5 Drawing Sheets

(56) References Cited

U.S. PATENT DOCUMENTS

2015/0347279 A1* 12/2015 Sethu ................. G06F 11/3684
714/38.1

* cited by examiner

31

```
Error in the input line : 8
Input line : (
Error in the input line : 8
Input line : (
Error in the input line : 8
Input line : "Scripting.FileSystemObject"
Error in the input line : 8
Input line : )
Warning in the input line 210
JScript Warning : if given string contain '/' it will be removed due to custom function
Warning in the input line 232
JScript Warning : if given string contain '/' it will be removed due to custom function
Warning in the input line 279
JScript Warning : Depending on the parent object, this should be changed to count/length/count()
Warning in the input line 307
JScript Warning : Depending on the parent object, this should be changed to count/length/count().
Warning in the input line 331
JScript Warning : Depending on the parent object, this should be changed to count/length/count().
Warning in the input line 1
JScript Warning : Depending on the parent object, this should be changed to count/length/count()
Warning in the input line 348
JScript Warning : Depending on the parent object, this should be changed to count/length/count()
Warning in the input line 349
JScript Warning : if given string contain '/' it will be removed due to custom function
Warning in the input line 367
JScript Warning : Depending on the parent object, this should be changed to count/length/count().
Warning in the input line 1
JScript Warning : Depending on the parent object, this should be changed to count/length/count().
Warning in the input line 385
JScript Warning : Depending on the parent object, this should be changed to count/length/count().
```

Figure 5

SMART MIGRATION/REMEDIATION ENGINE

STATEMENT OF RELATED APPLICATIONS

We claim priority from Indian Patent 201741020045 filed on 7 Jun. 2017.

BACKGROUND OF THE INVENTION

Historically, companies interested in software quality assurance for enterprise systems adopted methodologies and tools used for testing software in the software development space. While this approach worked initially, IT project managers quickly discovered several challenges:

First, Systems designed for simple automated regression testing of custom software, such as QTP, generate test scripts that are highly fragile when the underlying systems change. When systems change, scripts break and repairing them is both costly and time-consuming. Second, business process testing for enterprise systems requires the involvement of business users, yet legacy tools such as QTP require people with programming skills. Very few business subject matter experts are also visual basic programmers, so this creates costly resource issues. Modern, multi-system, end-to-end business processes are nearly impossible to test in an automated fashion using these legacy tools [1].

TECHNICAL FIELD

The present invention describes a system that helps in the migration and remediation of test scripts post migration while using best practises and manual intervention.

DISCUSSION OF PRIOR ART

U.S. Pat. No. 6,502,102 titled "System, method and article of manufacture for a table-driven automated scripting architecture" describes a system/method/apparatus that provides an automated scripting architecture which is table driven. The architecture is a two-tier architecture that works by dividing the test script information into a number of components having one or more words of same meaning, stores these into a database, parsed the components in one of the many words, search the database for one or the many words, receive the information related to it and execute the function related the meaning of the word. The test script relates to one or more steps and is Data driven, written using English-based interface accessed via a network.

US20030046029A1 titled "Method for merging white box and Black box testing" describes a system/method/apparatus that merges the white and the black box testing, during and after the development phase of software applications. The merging is done by determining the functionality of the application, prior to its release, by analysing the performance, black box testing done on the application and simulating the white box test conditions during black box testing. The simulation is done by applying a patch of a command line in the source code of the application to bypass the error. In response to the test analysis, probe libraries are generated, that contains white test, black test, and reusable test robes. To do the iterative test on the software during the development phase, and to communicate between the developer and the testing phases to define a gray box test, a requirements document is provided to a development and testing phase and generating a test case on it. The plug 'n 'play robes are utilized to test the software and errors, and deficiencies are communicated to the development cycle. The steps involved in the testing are creating a test project by selecting a program to be tested, selecting a repository for the program, defining a target for each primary executable of the program, stripping debug information into a local format, identifying probe entry points in the program, creating a probe library to use against the target, adding driver scripts, defining and generating a test case, creating a test case, combining the test case into a test set, running the test in accordance with the test case and test Set, analysing the results and repeating the test. Also, includes indicating DLLs, verifying debug information and noting modular dependencies.

The present invention describes a system that helps in the validation of the Data post migration while using the best practises.

BRIEF SUMMARY OF THE INVENTION

The present invention is a smart migration engine of a Test Tool Post Migration process. The system has built-in intelligence to scan the generated code from Test Tool Migration platform and further suggests to the users where ever there is an ambiguity. Thus, provides options to a user for resolving the ambiguity, issues, and warnings with best practise suggestions. The smart migration engine or Test Tool Post Migration platform comprises of a remedy engine, a reporting engine, and a log engine.

In the system in which the tool generated raw source has Object Repository, Test Data and Scripts which is validated by a Validator that checks the syntax and semantical errors in the generated source code through a Target Language Compiler, and lists warnings and errors. The Smart (migration) Remedy Engine bifurcates the Technical Logs and Reports through its Log Engine and Report Engine, taking inputs from a Suggestion Library and Training Data. The Data is further passed through a TODO Resolver that has a user interface which provides options to a user for resolving the ambiguity, issues, and warnings with best practise suggestions and the final scripts are generated based on the inputs given by the user.

This invention is a remediation system for test tool migration in automation testing between one or more source and target languages having, one or more users, tool generated raw source, a Validator, a best practise analyser, a Smart (migration) Remedy Engine, (f) a TODO Resolver, and one or more final scripts. The tool generated raw source comprises an Object Repository, Test Data and Scripts. The Validator validates the tool generated raw source for syntax and semantical errors through a Target Language Compiler, checking the lines of the source for Target Language Syntax and Target Language Semantics and lists warnings, stack traces, and errors. The best practise analyser comprises a Suggestion Library and Training Data that provide inputs on remedying the tool generated raw source based on historical data. The best practise analyser is trained with Training Data and Suggestion Library. It analyses the errors and warnings, and do a look-up in the Training Data and Suggestion Library for generating the recommendation. The Smart (migration) Remedy Engine consists of Log Engine and Report Engine that take inputs from the training module and produce Technical Logs and Reports to aid (autocorrect) remediation process. The TODO Resolver consists of a user interface and provides options to a user for resolving ambiguity, issues, and warnings with best practise suggestions. The final scripts are generated based on the inputs given by the user in the TODO Resolver. The best practise analyser reads the output of the Validator and the Target Language Compiler to evaluate the best practises, by analysing the generated source code and highlighting the warnings, errors, and other ambiguities to the user as per the standard best practises regarding reusability, maintainability, reliability and performance optimizations. The Log Engine generates Technical Logs with appropriate suggestions in the form of TODO list, errors, warnings, and stack traces. The Report Engine initiates the collection of Data from the Validator, Smart (migration) Remedy Engine, and Technical Logs, and generates a detailed report with line numbers. The system shows the conversion path, target Language, source, and target location with source and destination lines of code, with the Project name and the conversion time, along with the line number for the error with error, line number for the warnings along with warnings and shows the target code converted by the source code.

A remediation method for test tool migration in automation testing between one or more source and target languages having, one or more users, tool generated raw source, a Validator, a best practise analyser, a Smart (migration) Remedy Engine, (f) a TODO Resolver, and one or more final scripts. Reading the tool generated raw source including object repositories, Test Data, and Scripts. Compiling the generated source by the Validator through the Target Language Compiler. Reading the Validator generated warnings and errors such that the best practise analyser can use those warnings, errors and other ambiguities, highlighting them to the user as per the standard best practises regarding reusability, maintainability, reliability and performance optimizations. The Smart (migration) Remedy Engine Reading reads the Suggestion Library and Training Data and processing the source accordingly. The Log Engine generating Technical Logs with appropriate suggestions in the form of TODO list, errors, warnings, and stack traces. The Report Engine generating reports by initiating collection of Data from the Validator, Smart (migration) Remedy Engine and from Technical Logs, and generates a detailed report with line numbers. The TODO Resolver generating final scripts and ending the process.

Post remediation, the system shows the errors, warnings and other code that are not converted. Technical User who has knowledge on the target tool will go through them manually and fixes appropriately. However, the suggestions are provided by the system, but it is the end user's decision to accept the suggestion or fixing.

Further, displaying the conversion path, target Language, source, and target location with source and destination lines of code, with the Project name and the conversion time, along with the line number for the error with error, line number for the warnings along with warnings and shows the target code converted by the source code.

BRIEF DESCRIPTION OF THE DRAWINGS

FIG. 5 illustrates the system display of sample Technical Logs.

DETAILED DESCRIPTION OF PREFERRED EMBODIMENTS

Figure 1:
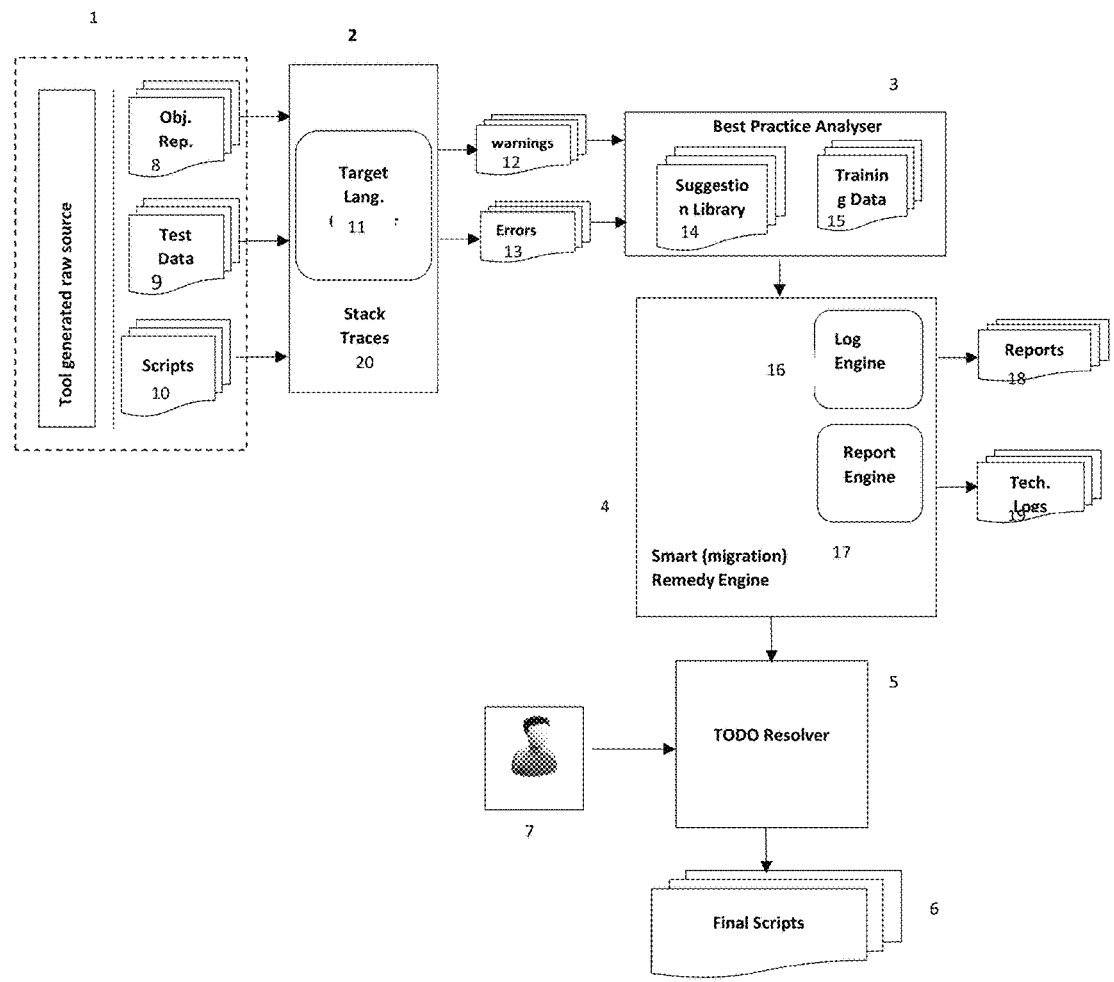
FIG. 1 illustrates the overall system diagram of Smart Migration.

FIG. 1 shows the overall system in which the tool generated raw source 1 has Object Repository 8, Test Data 9 and Scripts 10 which is validated by a Validator 2 that checks the syntax and semantical errors in the generated source code through a Target Language Compiler 11 and lists warnings 12, stack traces 20 and errors 13. The Smart (migration) Remedy Engine 4 bifurcates the Technical Logs 18 and Reports 19 through its Log Engine 16 and Report Engine 17, taking inputs from a best practise analyser 3 which consists of a Suggestion Library 14 and Training Data 15. The best practise analyser 3 is trained with Training Data and Suggestion Library. It analyses the errors and warnings, and do a look-up in the Training Data and suggestion library for generating the recommendation. The Data is further passed through a TODO Resolver 5 that has a user interface which provides options to a user 7 for resolving the ambiguity, issues, and warnings with best practise suggestions and the final scripts 6 are generated based on the inputs given by the user 7.

Post remediation, the system shows the errors, warnings and other code that are not converted. A technical user who has knowledge on the target tool will go through them manually and fixes appropriately. However, the suggestions are provided by the system but it is the end user's decision to accept the suggestion or fixing.

Figure 2:
FIG. 2 illustrates the system display of sample errors.

FIG. 2 shows the detailed analysis 25, 26, 27 of the errors 28 gathered by the Log Engine. It shows the conversion path, Target Language, Source, and Target Location with the source and destination lines of code. It also gives the Project name and the conversion time. It shows the line number of the error along with the error.

Figure 3:
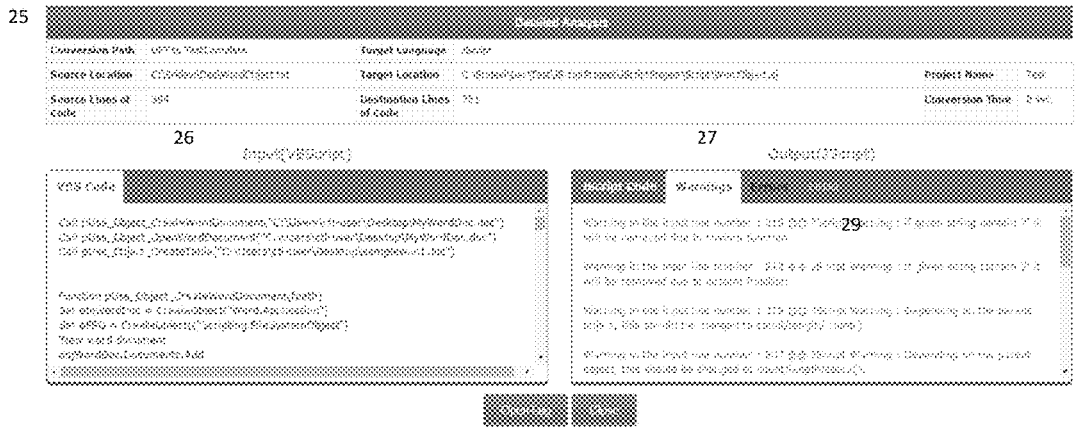
FIG. 3 illustrates the system display of sample warnings.

FIG. 3 shows the detailed analysis 25, 26, 27 of the warnings 29 gathered by the Log Engine. It shows the conversion path, Target Language, Source, and Target Location with source and destination lines of code. It also gives the Project name and the conversion time. It shows the line number of the warnings along with warnings.

Figure 4:
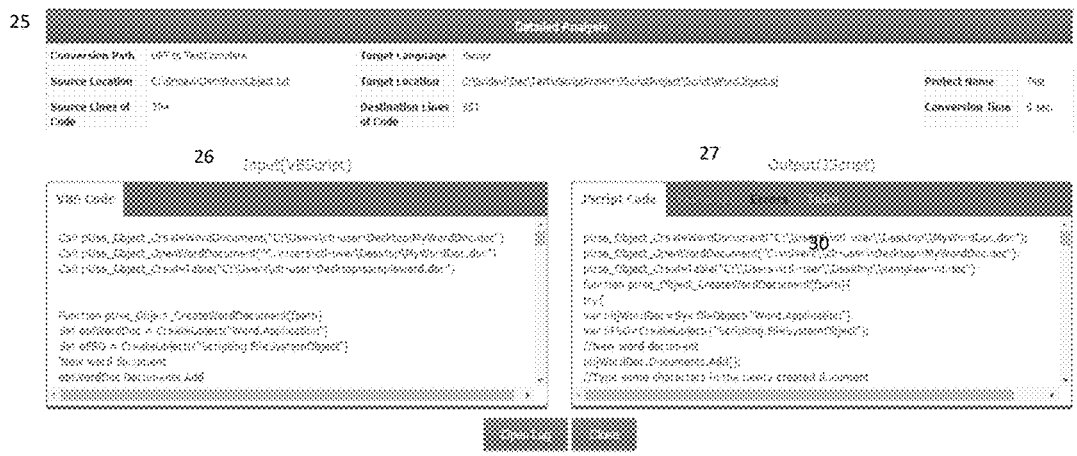
FIG. 4 illustrates the system display of sample target code.

FIG. 4 shows the target code. It shows the conversion path, Target Language, Source, and Target Location with source and destination lines of code 25, 26, 27. It also gives the Project name and the conversion time. It shows the target code 30 converted by the source code.

FIG. 5 shows the system display of sample Technical Logs which consists of errors 31 and warnings.

Figure 6:
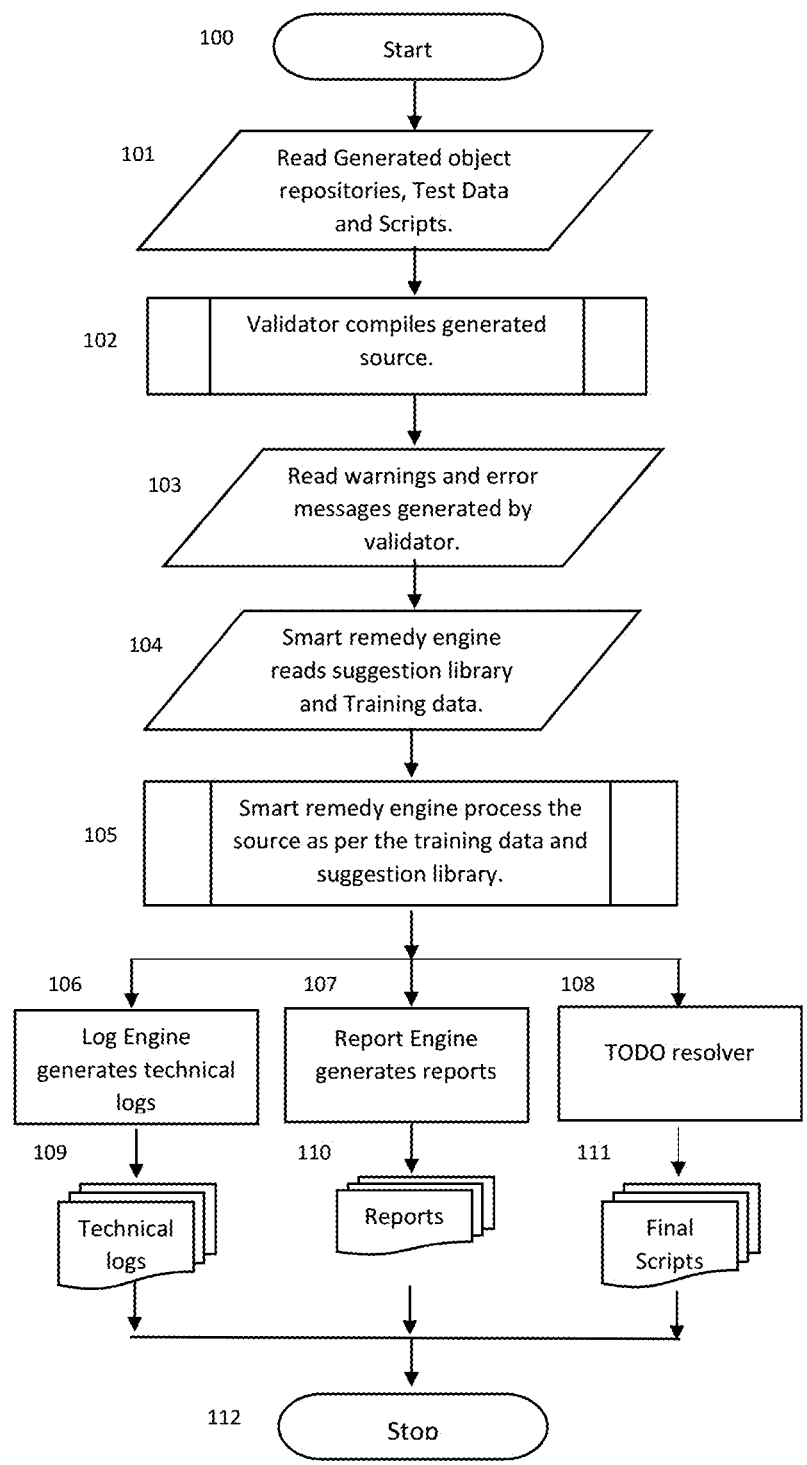
FIG. 6 illustrates entire process of the Smart Migration.

FIG. 6 shows the entire process of the Smart Migration. The tool generated raw source including object repositories, Test Data, and Scripts 101 is read. The generated source 102 is compiled by the Validator through the Target Language Compiler. The Validator generated warnings and errors are read 103 such that the best practise analyser can use those warnings, errors and other ambiguities, highlighting them to the user as per the standard best practises regarding reusability, maintainability, reliability and performance optimizations. The Smart Remedy Engine reads 104 the Suggestion Library and Training Data and processing 105 the source accordingly. The Log Engine 16 generating Technical Logs 106, with appropriate suggestions in the form of TODO list, errors, warnings, and stack traces. The Report Engine 107 generates reports by initiating collection of Data from the Validator, Smart (migration) Remedy Engine and from Technical Logs 109, and generates a detailed report 110 with line numbers. The TODO Resolver 108 generates the final scripts 111. The conversion path, target Language, source, and target location with source 26 and destination 27 lines of code are displayed, with the Project name and the conversion time, along with the line number for the error 31 with error 28, line number for the warnings along with warnings 29 and shows the target code 30 converted by the source code.

REFERENCES

1. "Migration of QTP Scripts to Worksoft Certify", 2017, Worksoft.

The invention claimed is:

1. A remediation system for test tool migration in automation testing between one or more source and target languages having, (a) one or more users 7, (b) tool generated raw source 1, (c) a Validator 2, (d) a best practise analyser 3, (e) a Smart (migration) Remedy Engine 4, (f) a TODO Resolver 5, and (g) one or more final scripts 6, wherein: (i) The tool generated raw source 1 comprises an Object Repository 8, Test Data 9 and Scripts 10; (ii) The Validator 2 validates the tool generated raw source 1 for syntax and semantical errors through a Target Language Compiler 11, checking the lines of the source for Target Language Syntax and Target Language Semantics and listing warnings 12, stack traces 20 and errors 13; (iii) The best practise analyser 3 comprises a Suggestion Library 14 and Training Data 15 that provide inputs on remedying the tool generated raw source 1 based on historical data; (iv) The Smart (migration) Remedy Engine 4 consists of Log Engine 16 and Report Engine 17 that take inputs from the training module and produce Technical Logs 18 and Reports 19 to aid (autocorrect) the remediation process; (v) The TODO Resolver 5 consists of a user interface and provides options to a user 7 for resolving ambiguity, issues, and warnings with best practise suggestions; and (vi) The final scripts 6 are generated based on the inputs given by the user 7 in the TODO Resolver 5.

2. The remediation system of claim 1, wherein the best practise analyser 3 reads the output of the Validator 2 and the Target Language Compiler to evaluate the best practises, by analysing the generated source code and highlighting the warnings, errors, and other ambiguities to the user as per the standard best practises regarding reusability, maintainability, reliability and performance optimizations.

3. The remediation system of claim 1, wherein the Log Engine 16 generates Technical Logs 19 with appropriate suggestions in the form of TODO list, errors 13, warnings 12, and stack traces 20.

4. The remediation system of claim 1, wherein the Report Engine 17 initiates the collection of Data from the Validator 2, Smart (migration) Remedy Engine 4 and Technical Logs 18, and generates a detailed report with line numbers 31.

5. The remediation system of claim 1, wherein the system shows the conversion path, target Language, source, and target location with source 26 and destination 27 lines of code, with the Project name and the conversion time, along with the line number for the error 31 with error 28, line number for the warnings along with warnings 29 and shows the target code 30 converted by the source code.

6. A remediation method for test tool migration in automation testing between one or more source and target languages having, (a) one or more users, (b) tool generated raw source 1, (c) a Validator 2, (d) a best practise analyser 3, (e) a Smart (migration) Remedy Engine 4, (f) a TODO Resolver 5, and (g) one or more final scripts 6, comprising the steps of:
   (i) Reading the tool generated raw source including object repositories, Test Data, and Scripts 101;
   (ii) Compiling the generated source 102 by the Validator through the Target Language Compiler;
   (iii) Reading 103 the Validator generated warnings and errors such that the best practise analyser can use those warnings, errors and other ambiguities, highlighting them to the user as per the standard best practises regarding reusability, maintainability, reliability and performance optimizations;
   (iv) The smart remedy engine reading 104 the Suggestion Library and Training Data, and processing 105 the source accordingly;
   (v) The Log Engine generating Technical Logs 106 with appropriate suggestions in the form of TODO list, errors, warnings, and stack traces;
   (vi) The Report Engine 107 generating reports by initiating collection of Data from the Validator, Smart (migration) Remedy Engine and from Technical Logs 109, and generating detailed report 110 with line numbers; and
   (vii) The TODO Resolver 108 generating final scripts 111 and ending the process 112.

7. The remediation method of claim 6, further comprising the step of displaying the conversion path, target Language, source, and target location with source 26 and destination 27 lines of code, with the Project name and the conversion time, along with the line number for the error 31 with error 28, line number for the warnings along with warnings 29 and shows the target code 30 converted by the source code.

* * * * *